United States Patent
Wilson

[11] Patent Number: 5,958,802
[45] Date of Patent: Sep. 28, 1999

[54] PRESSURE SENSITIVE RELEASABLE ADHESIVE WEBBING

[76] Inventor: Evelyn Wilson, 235 Robinson Dr., Oak Harbor, Ohio 43449

[21] Appl. No.: 08/713,999

[22] Filed: Sep. 18, 1996

[51] Int. Cl.$^6$ ....................................................... C09J 7/02
[52] U.S. Cl. ............................ 442/43; 442/151; 428/343; 428/354; 428/355 RA
[58] Field of Search .................... 428/343, 354, 428/355 RA; 442/43, 45, 151

[56] References Cited

U.S. PATENT DOCUMENTS

| | | | |
|---|---|---|---|
| 2,364,001 | 11/1944 | Schieman | 428/343 |
| 3,364,063 | 1/1968 | Satas | 428/343 |
| 3,794,554 | 2/1974 | Caring | 428/343 |
| 3,853,595 | 12/1974 | Pedginski | 117/68.5 |
| 3,936,944 | 2/1976 | Byne | 428/343 |
| 3,947,896 | 4/1976 | Taylor | 428/343 |
| 4,522,870 | 6/1985 | Esmay . | |
| 5,057,347 | 10/1991 | Alvin | 428/43 |
| 5,130,185 | 7/1992 | Ness | 428/354 |
| 5,198,292 | 3/1993 | Lerner . | |
| 5,429,850 | 7/1995 | Held | 428/343 |

*Primary Examiner*—Jenna Davis
*Attorney, Agent, or Firm*—Jerry Semer

[57] ABSTRACT

The invention is basically ultra thin webbing that has been coated with a pressure sensitive adhesive that easily releases from the material. The webbing is manufacturer by producing an ultra thin webbing and the placing that webbing in a vat of pressure sensitive material that produces a coating on the webbing that enables the webbing to be attach to a material and also to be easily removed from the material. The webbing is coated such that the adhesive is on both side of the webbing and thus the webbing can be attached to materials on either side or both. The material is produced in sandwich form in which a release paper is attached by pressure to both sides. When an individual wishes to transfer a pattern to fabric the individual removes the release paper from one side of the webbing. Then the individual places the pattern on the webbing. Then one removes the other release paper and places the side not attached to the pattern against the fabric. The webbing can also sold in a sandwich that would contain the pattern attached to the webbing and on the other side of the webbing would be attached the material. Or the pattern could be sold separately just having the pattern attached to the webbing with a release paper placed on the other side of the webbing.

8 Claims, 8 Drawing Sheets

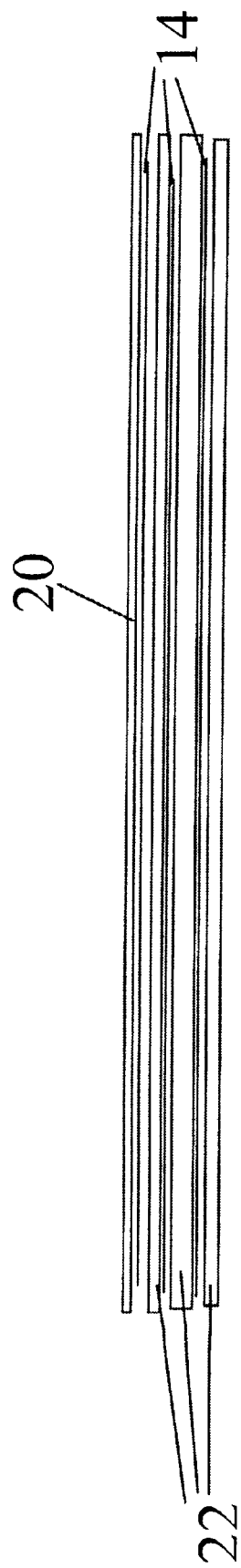

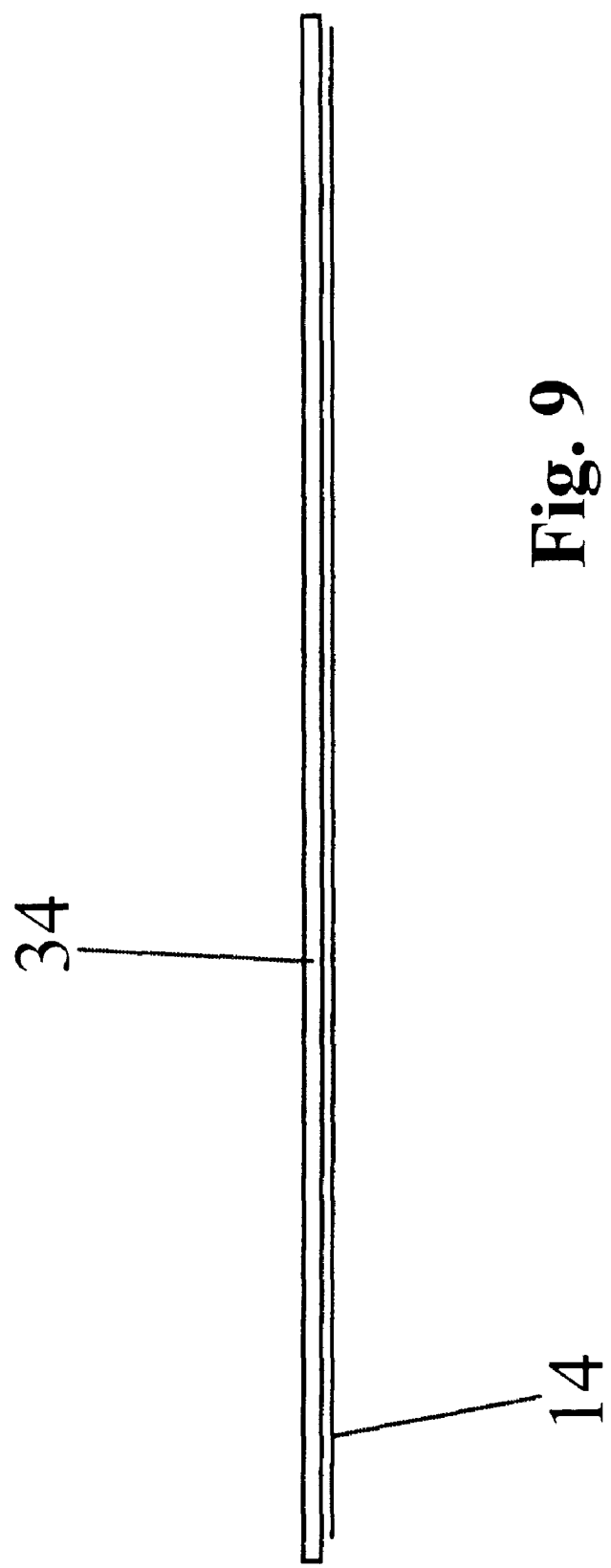

PRESSURE SENSITIVE RELEASABLE ADHESIVE WEBBING

FIELD OF THE INVENTION

Present invention relates to a new pressure sensitive releasable adhesive webbing and a method of manufacturing the webbing and more specifically the use of said webbing in sewing and attaching articles.

BACKGROUND OF THE INVENTION

One of the problems in doing sewing is how does one attach the pattern to the material so that one can draw or cut out around said pattern. The traditional way of doing it is to use pins upon the pattern.

Another method of attaching the pattern to your material is the use of weights. However, many problems develops from the use of weights. First it is easy with any type of pressure on the pattern to cause the pattern to shift. Also it is very difficult to cut around a pattern which weights have been placed on top. It is almost impossible to pick up the material and the pattern and cut around it with out causing the pattern to shift. Therefore, one of the objective of the invention is to create a method to attach the pattern to the material so that it can be easily drawn or cut around without worrying about the shifting of the pattern.

The pinning of the material around the pattern however is very time consuming. Thus, one of the objective of the invention is to create a method to attach a pattern to the material that is easy and quick. In placing the pins around the pattern it is necessary for you to place pins each time you use the pattern. Also pins can not be used on certain fabrics because they place permanent holes in the fabrics. People who have arthritis in their hands find it very difficult to place pins within fabric.

One of the method to avoid the use of pins or weights that has been developed is to iron on the pattern on the paper. One of the problems with this method of attaching the pattern to the material is if you wish to reposition the pattern on the paper you must heat up the iron on substance again reposition it and iron the pattern back on the paper. This is very time consuming and also the pattern can only be reironed down a certain number of times. Thus, one of the objective of this invention is to create a material that holds the pattern to fabric but can be reposition easily. Also iron on pattern do not work when one wish to cut the pattern out of several layers of fabric. Although the pattern can be attach to the top layer of fabric you need either the use of weights or pins to hold the other layer of fabric. Thus, an objective of the invention is to create a material that can hold several layers of fabric to the pattern.

The features that allow the invention to meet the objectives stated above is an ultra thin webbing that is covered with a pressure sensitive adhesive that easily releases from an object.

SUMMERY OF THE INVENTION

The invention is basically ultra thin webbing that has been coated with a pressure sensitive adhesive that easily releases from the material. The webbing is manufacturer by producing an ultra thin webbing and the placing that webbing in a vat of pressure sensitive material that produces a coating on the webbing that enables the webbing to be attach to a material and also to be easily removed from the material. The webbing is coated such that the adhesive is on both side of the webbing and thus the webbing can be attached to materials on either side or both. It is this ability of the webbing to attach to material on both sides that makes it so useful in the transfer of patterns in sewing. The material is produced in sandwich form in which a release paper is attached by pressure to one side of the webbing and another release paper is attached by pressure to the other side of the webbing. When an individual wishes to transfer a pattern to fabric the individual removes the release paper from one side of the webbing. Then the individual either places the pattern on the webbing and applies pressure to the pattern to form a bond between the pattern and the webbing or places the webbing on the pattern and places pressure on the webbing to form a bond between the pattern and the webbing. Then one removes the other release paper and places the side not attached to the pattern against the fabric. One can do this by either lying the pattern and webbing on the fabric and putting pressure on the pattern and webbing or by laying the fabric on the pattern and webbing and putting pressure on the fabric. This pressure sensitive web could also be sold in stores with a pattern already attached. In this state it would be sold in a sandwich that would contain the pattern attached to the webbing and on the other side of the webbing would be attached the material. Or the pattern could be sold separately just having the pattern attached to the webbing with a release paper placed on the other side of the webbing.

BRIEF DESCRIPTION OF THE DRAWINGS

FIG. 8 is a side view of the webbing with a pattern on top on several layers of fabric by the webbing.

FIG. 9 is a side view of a poster with the webbing on its back.

DETAILED DESCRIPTION OF THE PREFERRED EMBODIMENT

Figure 1:
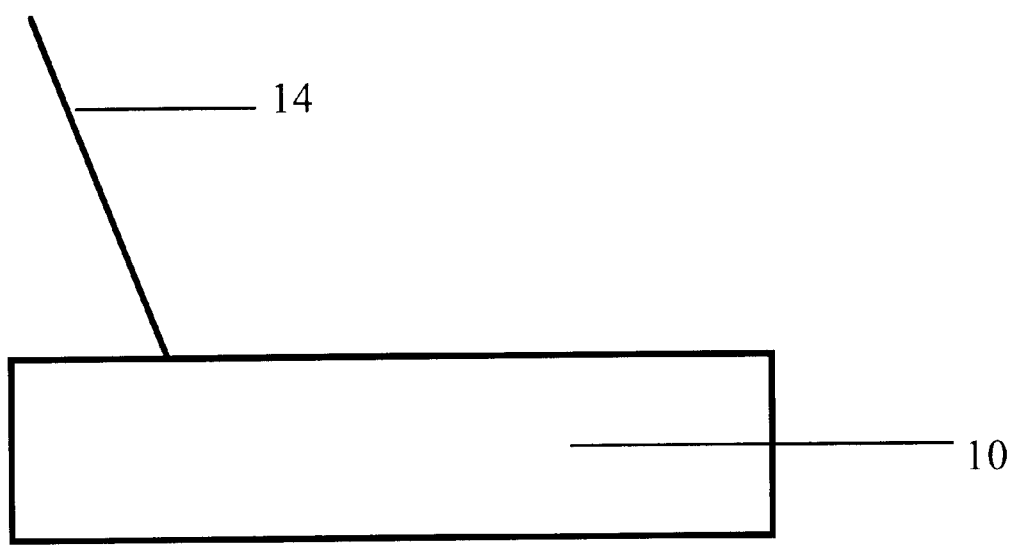
FIG. 1 is a drawing depicting placing the webbing in a vat.
Figure 2:
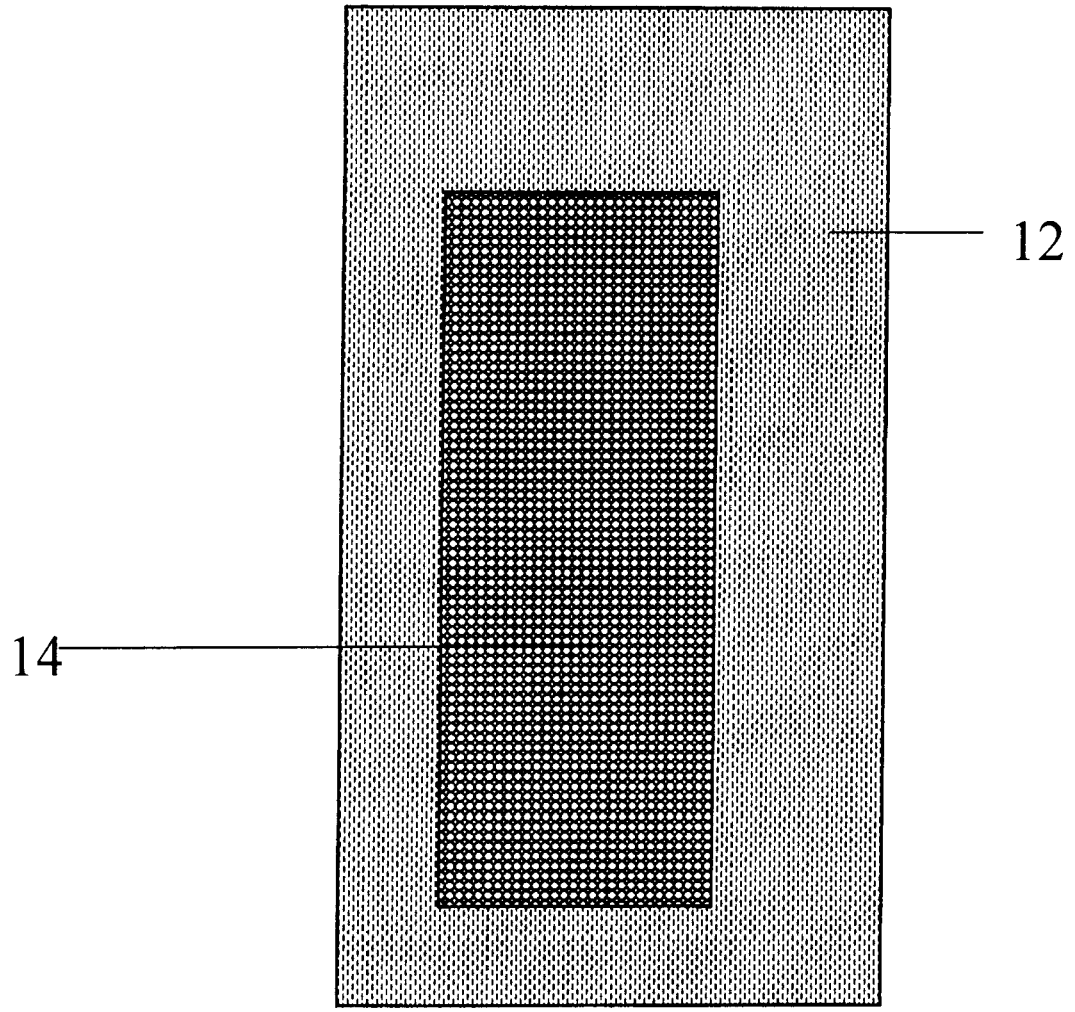
FIG. 2 is a top view of the vat with the webbing in it.
Figure 3:
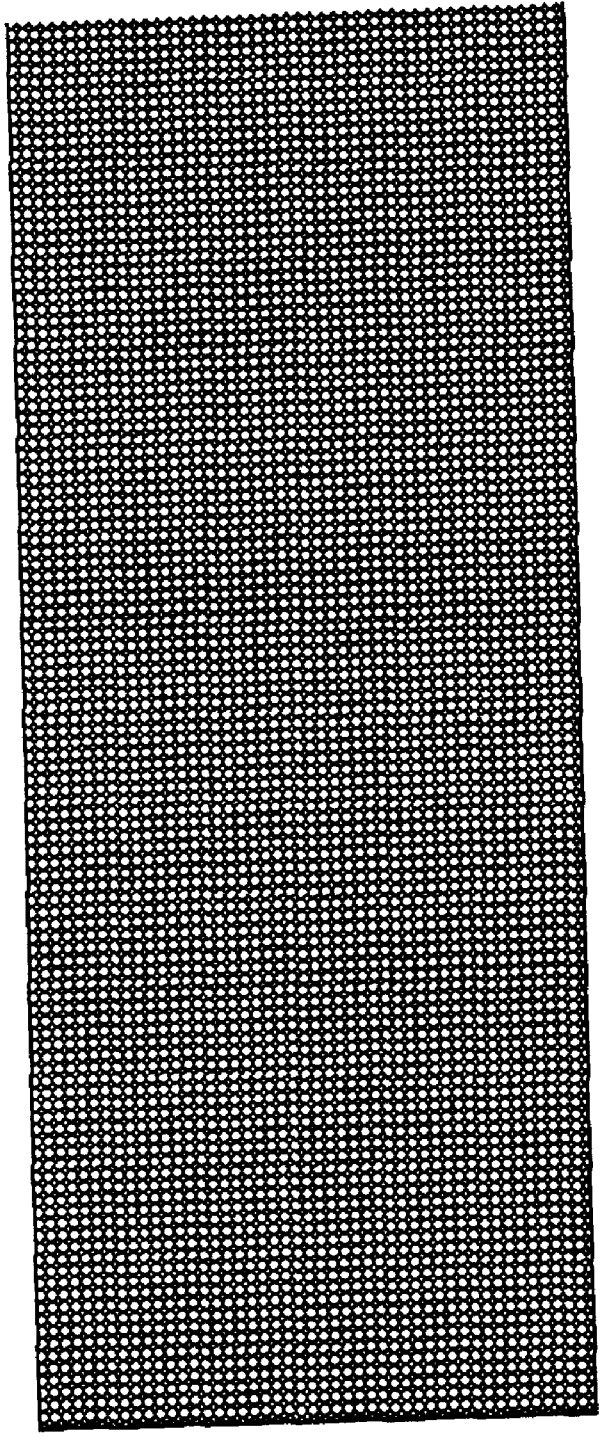
FIG. 3 is a view of the webbing dry.

The pressure sensitive adhesive webbing is created by the process shown in FIG. 1, 2, and 3. In FIG. 1 it shows the vat 10 of pressure sensitive liquid 12 that will produce a coating on the webbing. Also in FIG. 1 the webbing 14 is being placed in the vat 10. FIG. 2 shows the webbing 14 in the pressure sensitive liquid 12 and FIG. 3 shows the webbing 14 after being taken out of the pressure sensitive liquid 12 to be dried. Once the webbing 14 dries there will be a pressure sensitive adhesive on both sides of the webbing 14 and the webbing 14 coated with the pressure sensitive adhesive can easily be placed against the material and removed easily from that material. Also, this webbing 14 is designed such that it can hold two different materials together by placing the materials against each of the opposing sides of the webbing 14.

Figures 4, 5:
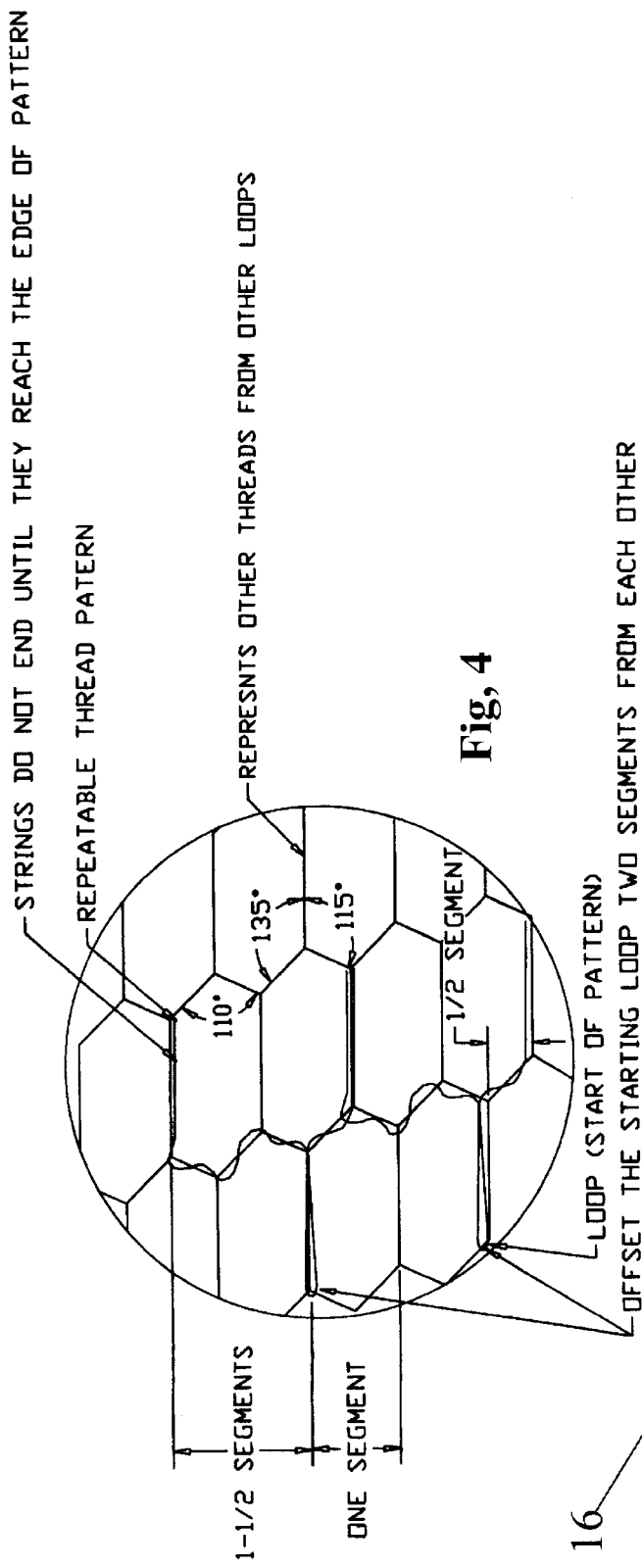
FIG. 4 is a microscopic view of the webbing.
FIG. 5 is a microscopic side view of the webbing.
Figure 6:
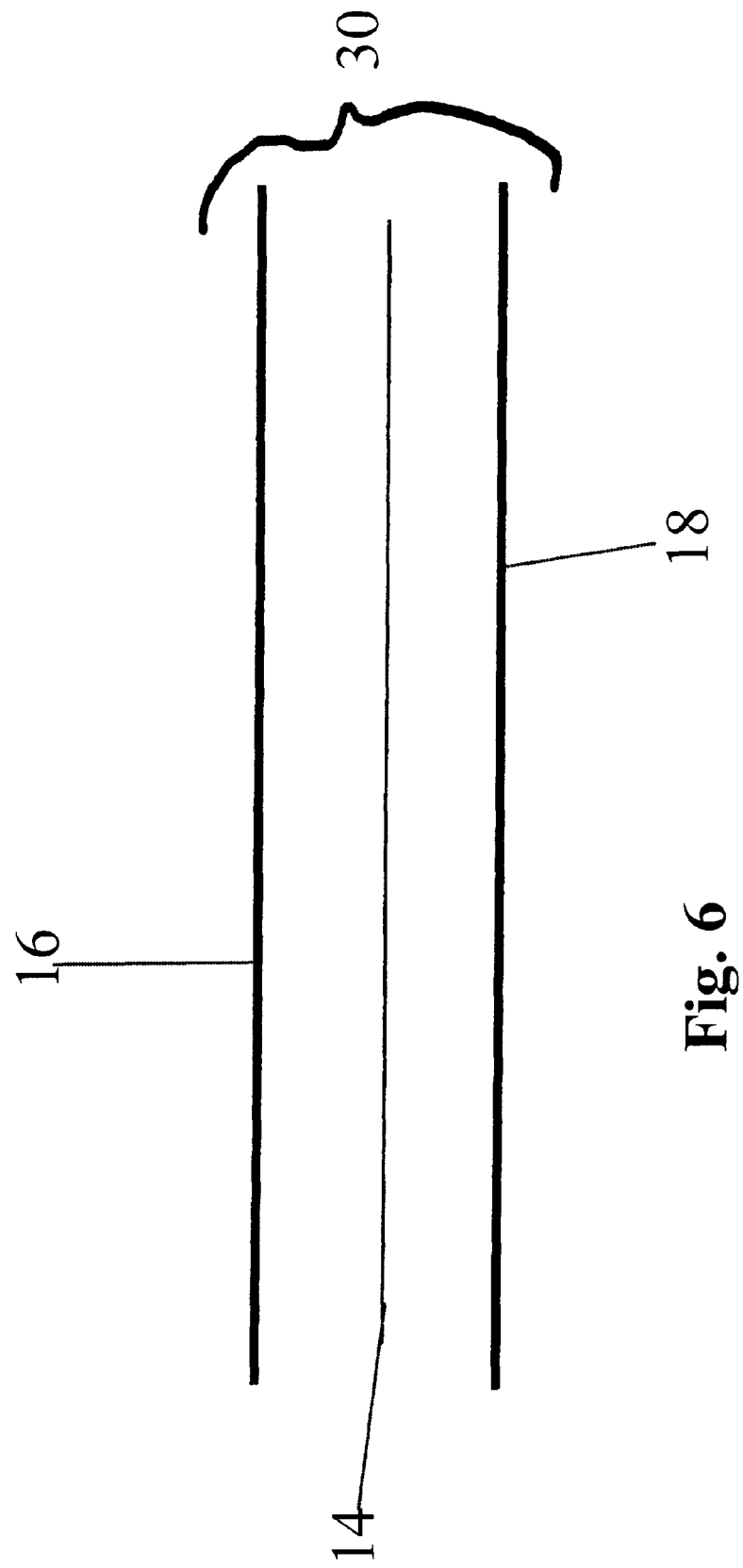
FIG. 6 is an exploded view of the webbing with the releasing papers on both sides.

The use of the webbing for creating a pattern for sewing is shown in FIGS. 4 through 6. FIG. 4 shows the webbing 14 of the preferred embodiment. The webbing 14 in the preferred embodiment is made out of plastic. In order for the webbing to be used to hold patterns on material the webbing must be ultra thin yet strong. Thus, in the preferred embodiment the inventor has used a plastic webbing that is both strong and ultra thin. However, other material that are both strong and thin could be used for webbing 14 material in this invention.

The webbing 14 that is used for sewing in the transfer of patterns needs to be ultra thin. Webbing 14 needs to be thinner than 1/10 of an inch and preferably less than 1/100 of an inch. In the preferred embodiment the webbing is 0.004 inches or less. This is because webbing 14 that is much thicker would cause uneven cutting around a pattern. Also with a thicker webbing 14 it would be very difficult to transfer a pattern to material. Thick webbing 14 would cause the material to become lumpy and unsatisfactory. The webbing 14 would also need to be light since one needs to pick up the pattern to cut around. Also if the webbing 14 is used to hang a picture on the wall the lighter it is the less weight the pressure sensitive adhesive needs to hold. Thus the webbing 14 should be less than one gram per square inch. In the preferred embodiment the webbing 14 weighs less than 0.02 ounces per square inch.

Figure 7:
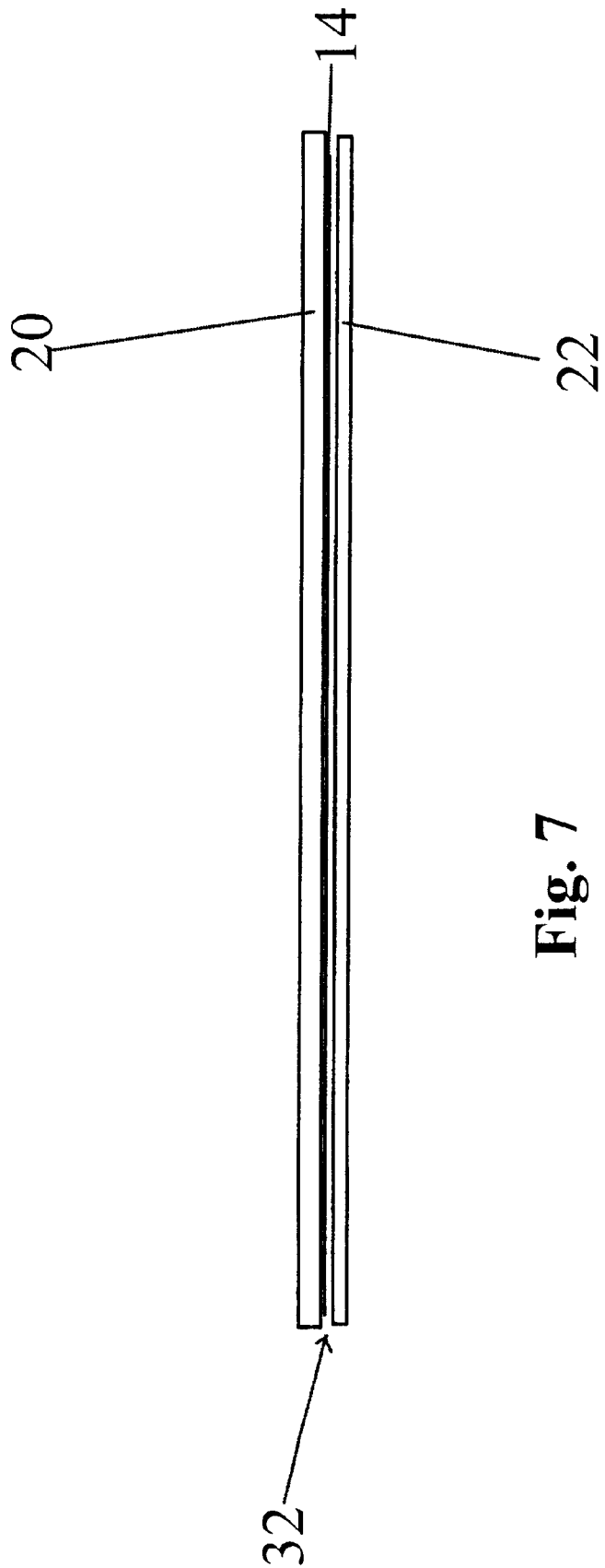
FIG. 7 is a side view of the webbing with a pattern on top and the fabric on the bottom.

FIG. 6 shows the webbing as it would be sold in stores. In this embodiment the webbing 14, made by the previous described process, is placed between two sheets of releasing paper 16 and 18. Releasing paper 16 or 18 is placed on the webbing 14 and then pressure is placed on the one side of the releasing paper 16 or 18 to cause the releasing paper 16 or 18 to stick to the webbing 14. This forms a sandwich 30 of releasing paper 16, then webbing 14 followed by releasing paper 18. When an individual purchases the webbing 14 he takes out the 14 webbing cuts it off to the desired size pulls off one of the releasing papers 16 or 18 and sticks it to the substance he wishes to use. In the case of a pattern 20 and fabric 22 you would either stick it to the pattern or fabric. Then the individual would take the releasing paper 16 or 18 off the other side and place either the pattern 20 or fabric 22 on top of the webbing 14 and put pressure on the pattern 20 or fabric 22 causing it to stick to the webbing 14. Then one has a sandwich 32 as shown in FIG. 7 that an individual can easily pick up and cut around the pattern for. If an individual wishes to cut out a pattern in more then one piece of fabric at the same time the individual would just then take the webbing 14 and attach it to the fabric 22 on which the pattern has already been placed and then place another piece of fabric on top of the webbing 14 and put pressure down upon it. To increase the layers the individual would just take the webbing 14 remove one side of the releasing paper and press it against the fabric 22 and then take off the other side of the releasing paper and press another layer of fabric 22 against the webbing 14 and the layers of fabric to produce another layer as shown in FIG. 8. This can go on until the individual has the number of layers they desire.

Then the pattern can be easily cut around the individual can actually hold the pattern up and cut around it since the fabric will not move. When one is done cutting out the pattern one just removes the pattern and the webbing 14 from the fabric. If the person is careful in removing the pattern and the webbing 14 from the fabric one can use the pattern over again.

It can also be used to transfer of patterns marking. It should also be noted that one does not necessary need to cut the webbing 14 to fit the whole pattern. One could just place small pieces in several locations between the pattern and the fabric to hold them together.

In sewing an item one sometimes has to transfer the pattern to the material being cut. This can be done by using transfer or carbon paper and a tracing wheel. A tracing wheel is a metal wheel with teeth. This wheel is rolled over pattern marking and through the use of the transfer paper underneath places these markings upon the fabric. To transfer pattern marking one would place the pattern on one side of the webbing 14. Then on the other side of the pattern one would place the transfer paper in the desired position. One would then place the material on the side of the webbing with the transfer paper. Then one would roll over the pattern markings with the tracing wheel. The teeth would place pressure on the transfer paper causing those marks to be place upon the fabric. The webbing 14 is so thin and loosely woven that it does not interfere with the transfer of these markings.

The webbing can also be used for quilting. In this case the webbing is placed on the underside of the fabric that is going to be placed on the quilt. The fabric is then placed in position on the quilt batting. The webbing holds the fabric in position until the individual can actually sew the fabric to the backing. This works better than the traditional method which is to pin the fabric to the backing. Pins as described above are time consuming to put in, cause damage to fabrics, and also are very difficult to use by people who have arthritis in their hands. It also should be noted that it is much easier to reposition the cloth on the backing if necessary with the webbing, since the fabric can be easily pulled from the backing and repositioned. Whereas with pins one must take all the pins out, move the fabric and then repin it.

Another use for the webbing 14 is placing poster 34 on walls. FIG. 8 shows how this is done. One of the releasing paper is removed from one of the sides of the webbing 14 and is pressed against and attach to the poster. The webbing 14 can cover the entire back of the poster or just a position of the back. Then the other release paper is removed from the webbing and the poster is placed against the wall. Since a large portion of the back of the poster is covered the poster will stick to the wall firmly. The poster can also be removed easily since there is not a great need for a large amount of adhesive on the back of the poster since the adhesive webbing covers the whole poster and has a large area of contact with the wall. The webbing is 14 ultra thin so it will not distort the appearance of the poster.

The webbing 14 can also be used in sewing for holding up cuffs and hems. In this case a hem would be folded and the releasing paper would be removed from the adhesive webbing 14 and press against one of the portions of the fold. Then the material would be folded over and pressed against the adhesive webbing 14 thus holding it into place. The webbing 14 can be ironed and still hold its adhesiveness.

Changes and modifications in the specificity described embodiments can be carried out without departing from the scope of the invention which is intended to limited only by the scope of the appending claims.

FIGS. 4 and 5 show a microscopic view of the webbing used in the preferred embodiment. FIG. 4 is a top microscopic view of the webbing and shows how the webbing is actually made out of strands that are woven together. FIG. 6 shows a side view of the webbing. This side view of the webbing shown in FIG. 6 shows how the strands are woven together. In FIG. 4 and FIG. 5 each segment is one tenth of a inch. As stated above any type of webbing can be used as long as the webbing is thinner than a tenth of an inch and preferably less than one hundredths of an inch. As pointed out above the webbing in the preferred embodiment is four thousandths of an inch or less. The webbing must be very thin and very light.

Changes and modifications in the specificity described embodiments can be carried out without departing from the scope of the invention which is intended to limited only by the scope of the appending claims.

I claim:

1. A pressure sensitive, releasable adhesive webbing comprising:
   a. an ultra thin, grid, with elements and visible spaces in between the elements, webbing with two sides; and,
   b. a pressure sensitive, releasable adhesive covering both sides of the grid webbing and said pressure sensitive, releasable adhesive is of such tackiness that when the webbing is placed against a piece of material and pressure is applied, said webbing will adhere to said material and said pressure sensitive, releasable adhesive is of such tackiness that the webbing can also be easily removed from said material; and,
   c. a first release liner attached to one side of grid webbing.

2. A pressure sensitive, releasable adhesive webbing as in claim 1 further comprising:
   a. a second release liner attached to the other side of grid webbing.

3. A pressure sensitive, releasable adhesive webbing comprising:
   a. An ultra thin grid with elements and visible spaces, the dimension of the spaces is approximately one tenth of an inch in circumference, and these spaces are a much greater dimension than the adjacent grid elements, webbing with two sides; and,
   b. A pressure sensitive, releasable adhesive covering both sides of the grid webbing and said pressure sensitive, releasable adhesive is of a tackiness that when the webbing is placed against a piece of material and pressure is applied, said webbing will adhere to the material and said pressure sensitive, releasable adhesive is of such tackiness that the webbing can also be easily removed from said material.

4. A pressure sensitive releasable adhesive webbing as in claim 3 wherein the ultra thin webbing is less than $1/100$ of an inch thick.

5. A pressure sensitive releasable adhesive webbing as in claim 3 wherein the ultra thin webbing is less than $1/10$ of an inch thick.

6. A pressure sensitive releasable adhesive webbing as in claim 3 wherein the webbing is less than $5/1000$ of an inch thick.

7. A pressure sensitive releasable adhesive webbing as in claim 1 wherein the ultra thin webbing is less than $1/100$ of an inch thick.

8. A pressure sensitive releasable adhesive webbing as in claim 1 wherein the webbing is less than $5/1000$ of an inch thick.

* * * * *